Patented July 10, 1928.

1,676,407

UNITED STATES PATENT OFFICE.

WILHELM NEELMEIER, OF LEVERKUSEN, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

HYDROXY-NAPHTHALENE-ARYLSULPHOESTER AZO DYESTUFF AND PROCESS OF MAKING THE SAME.

No Drawing. Application filed July 21, 1926, Serial No. 124,089, and in Germany August 2, 1924.

My invention consists in novel azo dyestuffs which contain as one of the components dihydroxy-naphthalene compounds with one of the hydroxy groups esterified by an arylsulphonic acid and in processes of making the same.

My invention provides for the production of very valuable orange to reddish-violet azo dyestuffs distinguished by clear shades and excellent fastness to light and milling when applied to animal fibres.

My preferred process for producing these novel azo dyestuffs consists in reacting in presence of a neutralizing agent with one molecular proportion of an arylsulphohalogenid upon one molecular proportion of an azo dyestuff containing a dihydroxy-naphthalene compound, such as a dihydroxy-naphthalene sulphonic acid, as one of its components. One of the hydroxyl groups of the latter is esterified by this process.

All the different dihydroxy-naphthalene compounds useful for the production of azo dyestuffs are applicable in my invention. The arylsulphohalogenids can be typified by the most commonly technically used; i. e., p-toluenesulphochloride, but others such as benzenesulphochloride or naphthalenesulphochlorides can be used to the same advantage in my invention.

My novel dyestuffs are usually orange to reddish-violet powders. They are soluble in water and concentrated sulphuric acid with from orange to violet colors. They yield by reduction an aromatic amine and an amino-hydroxy-naphthalene-sulphoarylester.

My invention is further illustrated by the following examples, the parts being by weight, but it is understood that it is not limited to the specific materials nor reacting conditions given therein.

Example 1.—The monoazodyestuff obtained in the usual manner from 123 parts o-anisidine and 364 parts 1-8-dihydroxy-naphthalene-3-6-disulphonate of sodium is dissolved in 2000 parts water and at 70–80° C. 190.5 parts p-toluenesulphochloride and 53 parts soda ash are added. The color of the reaction mixture changes quickly and the odor of the sulphochloride disappears gradually. The dyestuff is salted out after an hour's stirring. It is isolated and dried in the usual manner. It is a dark red powder, soluble in water and concentrated sulphuric acid with a blush-red color. It dyes wool from an acid bath level bluish-red shades of good fastness to light and milling. It has in the free state most probably the formula:

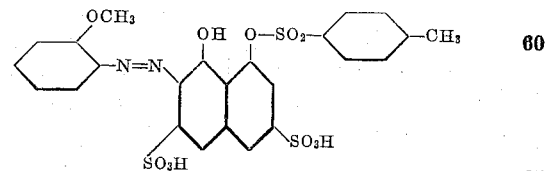

and yields by reduction o-anisidine and 2-amino-1-hydroxy-8-p-toluenesulphoester-3-6-disulphonic acid.

Example 2.—93 parts aniline are diazotized in the usual manner and coupled in acetic acid solution with 278 parts 1-6-dihydroxy-naphthalene-3-potassium sulphonate. The dyestuff is isolated in the usual manner and dissolved in 3000 parts water. 53 parts soda ash and 190.5 parts p-toluenesulphochloride are added and the reaction mass heated to 70–80° C. with stirring until the odor of the sulphochloride has disappeared. Most of the dyestuff formed has separated and is isolated as usual. It is in the dry state an orange-red powder, soluble in water and concentrated sulphuric acid with an orange-red color. It dyes wool from an acid bath orange-red shades of good fastness to light and milling. It has in the free state most probably the formula:

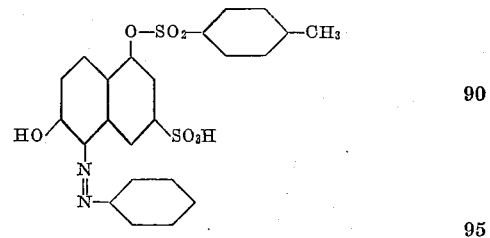

and yields by reduction aniline and 5-amino-6-hydroxy-naphthalene-1-p-toluolsulphoester-3-sulphonic acid.

I claim:—

1. The process of reacting with about mono-molecular proportions of p-toluolsulphochloride upon about mono-molecular proportions of the mono-azo-dyestuff obtained by cupling 2-diazo-benzene-1-methylether with 1-8-dihydroxy-naphthalene-3-6-disulphonic acid.

2. As a new product the mono-azo-dyestuff having in the free state most probably the formula:

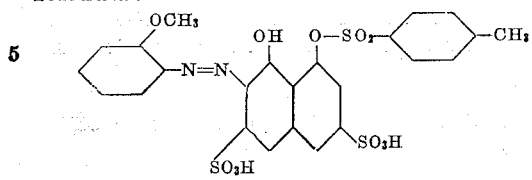

which is a dark red powder, soluble in water and in concentrated sulphuric acid with bluish-red colors, dyes wool level bluish-red shades fast to light and milling, and yields on reduction o-anisidine and 2-amino-1-hydroxy-8-p-toluenesulphoester-3-6-disulphonic acid.

3. The process of reacting with about mono-molecular proportions of para toluol-sulphochloride upon about mono-molecular proportions of the mono-azodyestuff of the formula:

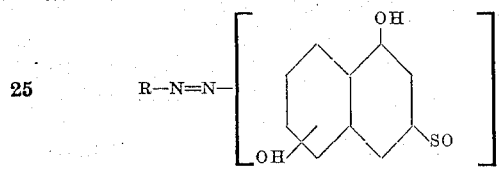

wherein R stands for an aromatic nucleus, wherein the OH group is in either the 6- or 8-position in the naphthalene nucleus, and wherein the naphthalene nucleus may be further substituted by a sulphonic acid group.

4. As new products, the mono-azo dyestuffs having in the free state most probably the formula:

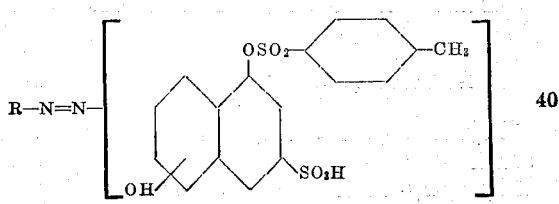

wherein R stands for an aromatic nucleus, wherein the OH group is in either the 6- or 8-position in the naphthalene nucleus, and wherein the naphthalene nucleus may be further substituted by a sulphonic acid group, which dyestuffs are red powders, soluble in water and in concentrated sulphuric acid with a red color, dye wool level red shades fast to light and milling, and yield on reduction an aromatic amine and an amino-hydroxy-naphthalene-arylsulphoester sulphonic acid.

In testimony whereof, I affix my signature.

WILHELM NEELMEIER.